A. C. HOPKINS.
VEHICLE WHEEL.
APPLICATION FILED MAR. 1, 1915.
1,153,919.
Patented Sept. 21, 1915.
2 SHEETS—SHEET 1.
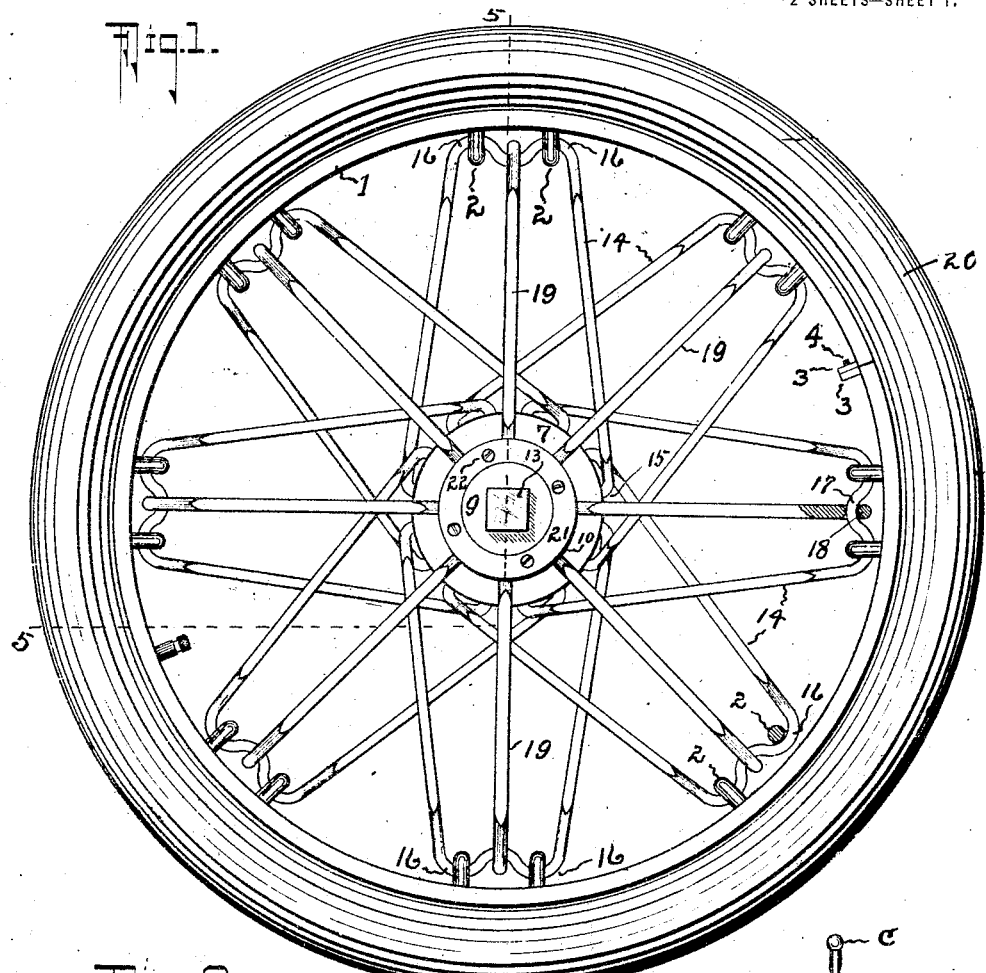
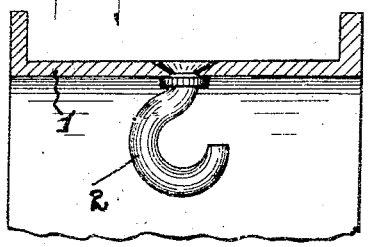
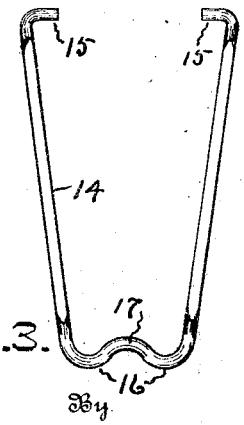
Witnesses
Arthur H. Sturges.
Kenneth S. Finlayson.
Inventor
Arthur C. Hopkins
Horace A. Sturges.
Attorney A. C. HOPKINS.
VEHICLE WHEEL.
APPLICATION FILED MAR. 1, 1915.
1,153,919.
Patented Sept. 21, 1915.
2 SHEETS—SHEET 2.
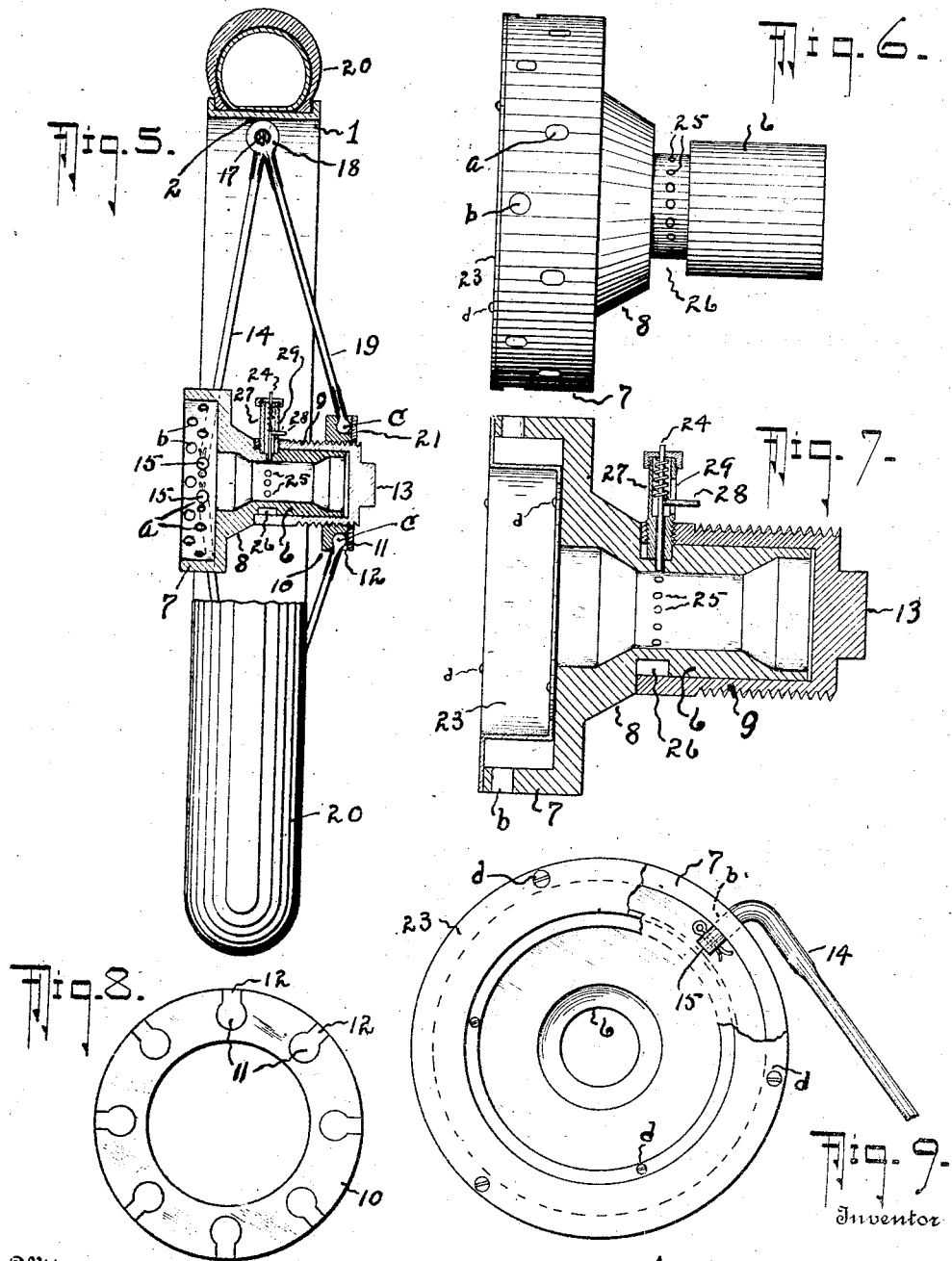

UNITED STATES PATENT OFFICE.

ARTHUR C. HOPKINS, OF SIOUX FALLS, SOUTH DAKOTA, ASSIGNOR OF ONE-HALF TO WILLIAM J. BUTTSCHAU, OF SIOUX FALLS, SOUTH DAKOTA.

VEHICLE-WHEEL.

1,153,919.  Specification of Letters Patent.  Patented Sept. 21, 1915.

Application filed March 1, 1915. Serial No. 11,419.

*To all whom it may concern:*

Be it known that I, ARTHUR C. HOPKINS, a citizen of the United States, residing at Sioux Falls, in the county of Minnehaha and State of South Dakota, have invented certain new and useful Improvements in Vehicle-Wheels, of which the following is a specification.

This invention relates to an improvement in vehicle wheels particularly adapted for use for the wheels of motor cars, and has for one of its objects to provide such a construction that the wheel at or near its periphery may have a much less weight than ordinary so that a lesser power will be required for propulsion.

Another object is to provide means to prevent lateral movements of the abutting ends of the rim, said rim being of the class which permits a decrease in its diameter for a mounting thereon of the conventional rubber casing and pneumatic tire.

The invention includes features by use of which the spokes may be attached to or removed from the rim and hub without the use of threaded connections, to thereby avoid the making of adjustments and to economize time; also to the use of spoke-members constructed of flat wires disposed edgewise at right angles to the axis of the wheel to more effectively resist stresses and to provide an increase in resiliency for these members, also to the provision of an annulus which is movable longitudinally of the hub, by means of which uniform and simultaneous tension may be applied to the spokes, to prevent breakage of any of the spokes, and tending to provide uniform pressure of the rim toward the hub.

With the foregoing objects in view and others to be mentioned hereinafter, the invention presents a novel construction, combination and arrangement of parts as described herein and claimed, and as illustrated in the drawing, it being understood that changes in form, size, proportion and minor details may be made within the scope of the claims without departing from the spirit of the invention or sacrificing any of its advantages.

In the drawing, Figure 1 is a front view of the wheel, parts of the spoke-members being in section. Fig. 2 is a sectional detail showing one of the hooks for the rim, these being arranged in pairs. Figs. 3 and 4 are views, respectively, of each of the spoke-members which are arranged in pairs. Fig. 5 is a sectional view on line 5 5 of Fig. 1, a part of the spoke-members being omitted, to clearly show construction. Fig. 6 is a view of the hub in side elevation. Fig. 7 is a view in longitudinal section of the hub and parts mounted thereon. Fig. 8 is an end view of the annulus. Fig. 9 is an end view of the hub, a dust cap being shown and parts broken.

Referring now to the drawing for a more particular description, numeral 1 indicates a wheel-rim provided on its inner side with detents or hooks 2, these being arranged in pairs and disposed at longitudinal intervals thereof. The rim, on its inner side is also provided at its ends with inwardly projecting flanges 3 adapted to abut upon each other, said flanges being provided with suitable connecting devices adapted to coact to prevent lateral relative movements of said ends, and preferably consisting of lugs 4 mounted on one of the flanges for engagement in suitable apertures formed in the other flange.

At 6 is indicated a hub, provided at its inner end with an annular flange 7, and adjacent to said flange with a boss 8, said flange being disposed substantially parallel with the longitudinal axis of the hub and provided near its medial line and at uniform intervals with apertures *a*, and near its outer edge with apertures *b*. A sleeve or cylindrical cap 9 is seated upon the hub, and it has bearings for its inner end upon the outer end of the boss.

At 10 is indicated a holder-member, preferably formed as an annulus or ring formed rectangular in cross-section. It is threaded on the sleeve or cylindrical cap, and is provided with circular recesses 11 opening on its outer end and with slots or recesses 12, each opening on its periphery and on a recess 11, said recesses 12 being disposed at uniform intervals of the periphery of said ring or annulus. In order that the sleeve or cap 9 may be conveniently rotated, it is provided at its outer end with the angular projection 13 which may be engaged by a wrench or similar hand-tool.

At 14 are indicated a plurality of spoke-members, each consisting of a metallic strand or wire, bent at its ends to form the hooks 15 for engagement, respectively, in an aperture $a$ and an aperture $b$ of the flange 7, and bent near its middle to provide the pair of outwardly curved loops 16 for engagement with a pair of hooks 2 of the rim, and bent to provide a curved depressed part 17 between the loops 16 for the support of the eye 18 at the outer terminal of a spoke-member 19, the opposite end of each member 19 traversing a slot 12 and being provided with an enlarged part $c$ of ball-shape and disposed in a recess 11.

As thus described the flange 7 provides a mounting for the inner ends of spoke-members 14, and the ring or holder-member 10 provides a mounting for the inner ends of spoke-members 19. The length of the metallic strands or wires are so proportioned that the loops 16 will engage the hooks 2 of the rim when the annulus 10 is disposed near the outer end of the cap 9.

Since the mountings of the inner ends of the spoke-members 14 and 19 are at different parts of the hub inwardly and outwardly thereof, they will be disposed inclinedly with reference to each other, and it is obvious that if the distance between the flange 7 and ring 10 is increased by rotating the cap in one direction, that the radial distance between the outer ends of spoke members 14, at opposed parts of the rim, will be decreased, with the result that all of the wires will become taut while connected with the rim, and the increased tension of the wires will tend to draw the rim in a direction of the hub.

It will be seen that the construction as described provides a convenient means for demounting a tire 20, for if the cap is rotated in a reverse direction to that last mentioned the radial distance between the ends of the spoke-members, at opposed parts of the rim, will be increased so that the loops 16 may be readily detached from the hooks 2, to permit removal of the rim; and the tire may then be removed from the rim since the rim may be manually reduced in diameter, the ends of said rim, after the flanges have been separated, being disposed to overlap.

As clearly shown in the drawing, the preferred construction for the wire spoke-members is to flatten them between their ends and to dispose them edgewise to the line of traction since they will more effectively resist stresses which are directed at right angles to the axis of the wheel, and by this arrangement they will provide a greater degree of resiliency during ordinary use of the wheel or when passing over obstructions.

Numeral 21 indicates a facing-rim adapted to cover the outer end of the holder-member or ring 10 to prevent dislodgement of the enlarged or ball-shaped terminals $c$ of spoke-members 19, and said rim may be secured by keepers 22.

Numeral 23 indicates an annular cover-plate preferably being angular in cross-section adapted to be disposed to cover the hooks 15 upon the inner side of the flange 7 and it may be secured to the flange by keepers $d$.

After the cap 9 has been rotated for moving the ring outwardly of the hub to provide a required degree of tension for the wire spoke-members it is desirable that any further rotation of the cap, which might be occasioned by vibration or accidental causes, be prevented; and any suitable means may be provided for this purpose, as the plunger 24 adapted to engage in any one of the recesses or apertures 25 formed in the annular groove 26 of the hub, the plunger being resiliently mounted in the barrel 27 which is mounted upon the inner end of said cap. Since the inner end of the barrel engages in the groove 26, any longitudinal movement of the cap on the hub will be prevented. By use of the lug 28, when manually operated, and which works in the slot 29 of the barrel, the plunger may be disengaged from the recesses.

Among some of the advantages to be derived by use of the invention, it may be stated that the annulus may be moved longitudinally of the hub very quickly and conveniently for releasing the spoke-members from the rim, and any desired degree of tension may be applied to the wire spokes, by rotating the cap.

It will be appreciated that the tension for the spokes will be uniform, the only requirements being that they be manufactured of uniform lengths and that their mountings in the flange and annulus as well as their mountings on the rim, be accurate; and the fact that the locking rings, the fellies, locking lugs, and the like, which are usually employed for vehicle wheels, may be dispensed with, results in a less weight at or near the periphery of the wheel. Also since the parts mentioned may be dispensed with, there will be, comparatively, a corresponding decrease in the cost of manufacture.

Having fully described my invention and the uses of its parts, a further explanation relating to operation is not necessary.

What I claim and desire to secure by Letters Patent is,—

1. The combination of a wheel rim, a hub having an annular groove formed therein with recesses opening on said groove, a cylindrical cap on the hub, an annulus threaded on the cylindrical cap, a plurality of metallic strands connected with the rim and hub, a plurality of metallic strands connected with the rim and annulus, said cylindrical cap being revoluble for moving the annulus longitudinally of the hub, and devices mounted on the cylindrical cap for engaging in said groove and recesses for normally preventing relative movements of the cylindrical cap and hub.

2. The combination of a wheel rim, a hub, an annulus carried by the hub, a plurality of spoke members each being substantially of U-shape connecting the hub and rim, a plurality of second spoke members each being removably mounted on one of the first named spoke members and connected with the annulus, and means for moving the annulus longitudinally of the hub.

3. The combination of a wheel rim, a hub, an annulus carried by the hub, a plurality of spoke members each being substantially of U-shape connecting the hub and rim, a plurality of second spoke members each being removably mounted on one of the first named spoke members and connected with the annulus, means for moving the annulus longitudinally of the hub, and means for maintaining the annulus in stationary relation with the hub after it has been moved longitudinally thereof.

4. The combination of a wheel rim provided with detents arranged in pairs, a hub, an annulus carried by the hub, a plurality of metallic strands substantially of U-shape each being mounted upon a pair of said detents and connected with the hub, a plurality of second metallic strands each having a part disposed between a pair of detents in engagement with one of said first named metallic strands, and having a part connected with the annulus, and means for moving the annulus longitudinally of the hub.

5. The combination of a wheel rim provided on its inner side with detents arranged in pairs, a hub, an annulus carried by and adapted to be moved longitudinally of the hub, a plurality of strands substantially of U-shape each being bent between its ends to provide outwardly curved portions and a depressed part intermediate said curved portions, each of said U-shaped strands being mounted with its ends in engagement with the hub, its outwardly curved portions being in engagement with a pair of the detents of the wheel rim, and a plurality of second metallic strands, each being mounted upon a depressed part of a first named metallic strand and connected with said annulus.

6. The combination of a wheel rim, a hub provided with a boss, an annulus circumscribing the hub, a rotatable cylindrical cap abutting upon the boss while interposed between the annulus and hub and having a threaded connection with said annulus, metallic strands substantially of U-shape connecting the rim and hub, and a plurality of second metallic strands each being connected with the annulus and one of the first named metallic strands.

7. The combination of a wheel rim provided on its inner side with detents arranged in pairs, a two-part hub, means for making longitudinal adjustments of the two parts of said hub relative to each other, a plurality of strands substantially of U-shape each being bent between its ends to provide outwardly curved portions and a depressed part intermediate said curved portions, each of said U-shaped strands being mounted with its ends in engagement with one part of said hub its curved portions being in engagement with a pair of detents of the wheel rim, and a plurality of second metallic strands each being mounted upon a depressed part of a first named metallic strand and connected with the other part of said hub.

8. The combination of a wheel rim provided on its inner side with detents arranged in pairs, a hub provided at its inner end with an annular flange having apertures formed therein at circumferential intervals and disposed substantially parallel with the longitudinal axis of said hub, an annulus circumscribing the hub, a rotatable cylindrical cap interposed between the annulus and hub and having a threaded connection with said annulus, metallic strands substantially of U-shape each having its ends mounted in apertures at opposed sides of said annular flange and engaging a pair of said detents, and a plurality of second metallic strands each being connected with the annulus and a U-shaped metallic strand.

9. The combination of a wheel rim, a hub, an annulus circumscribing the hub, a rotatable cylindrical cap circumscribing the hub and having a threaded connection with the annulus, a plurality of metallic strands connected with the hub and removably connected with the rim, and a plurality of secondary metallic strands removably connected with the annulus and removably connected with the first named strands.

In testimony whereof, I have affixed my signature in presence of two witnesses.

ARTHUR C. HOPKINS.

Witnesses:
 HIRAM A. STURGES,
 ARTHUR H. STURGES.